(12) United States Patent
Dueck

(10) Patent No.: US 11,524,256 B2
(45) Date of Patent: Dec. 13, 2022

(54) SCRUBBER FOR TREATING EXHAUST GAS FROM BIOMASS COMBUSTION

(71) Applicant: Raymond Dueck, East St. Paul (CA)

(72) Inventor: Raymond Dueck, East St. Paul (CA)

( * ) Notice: Subject to any disclaimer, the term of this patent is extended or adjusted under 35 U.S.C. 154(b) by 164 days.

(21) Appl. No.: 17/168,640

(22) Filed: Feb. 5, 2021

(65) Prior Publication Data

US 2021/0252446 A1 Aug. 19, 2021

Related U.S. Application Data

(60) Provisional application No. 62/976,620, filed on Feb. 14, 2020.

(51) Int. Cl.
| | | |
|---|---|---|
| *B01D 47/06* | (2006.01) | |
| *B01J 19/00* | (2006.01) | |
| *B01J 19/24* | (2006.01) | |
| *B01D 46/00* | (2022.01) | |
| *B01D 21/24* | (2006.01) | |
| *B01D 21/00* | (2006.01) | |
| *B01D 46/16* | (2006.01) | |
| *B01D 50/60* | (2022.01) | |

(52) U.S. Cl.
CPC ........... *B01D 47/06* (2013.01); *B01D 21/009* (2013.01); *B01D 21/2455* (2013.01); *B01D 46/0035* (2013.01); *B01D 46/16* (2013.01); *B01D 50/60* (2022.01); *B01J 19/006* (2013.01); *B01J 19/245* (2013.01)

(58) Field of Classification Search
CPC .............. B01D 21/009; B01D 21/2455; B01D 21/2461; B01D 2252/1035; B01D 2257/404; B01D 2258/012; B01D 46/0035; B01D 46/10; B01D 46/16; B01D 47/02; B01D 47/06; B01D 50/006; B01D 50/60; B01D 53/1475; B01D 53/1481; B01D 53/507; B01D 53/56; B01D 53/79; B01D 53/81
See application file for complete search history.

(56) References Cited

U.S. PATENT DOCUMENTS

2017/0165609 A1* 6/2017 Norling .............. B01D 53/1475

* cited by examiner

*Primary Examiner* — Sharon Pregler
(74) *Attorney, Agent, or Firm* — Christopher J. Dynowski; Ryan W. Dupuis; Ade & Company Inc.

(57) ABSTRACT

A scrubber for treating exhaust gas generated by combustion of biomass comprises a plurality of chambers each configured to apply a scrubbing medium to the exhaust gas for removing solid particles from the exhaust gas. A first chamber includes at least one nozzle configured to dispense scrubbing liquid in a sheet oriented transversely to a path of flow of exhaust through the first chamber. A second chamber defines a reservoir for containing a bath of scrubbing liquid and further includes a baffle configured to deflect the exhaust gas into the bath. A third chamber is arranged to support a sheet of solid filter medium spanning across the chamber.

15 Claims, 6 Drawing Sheets

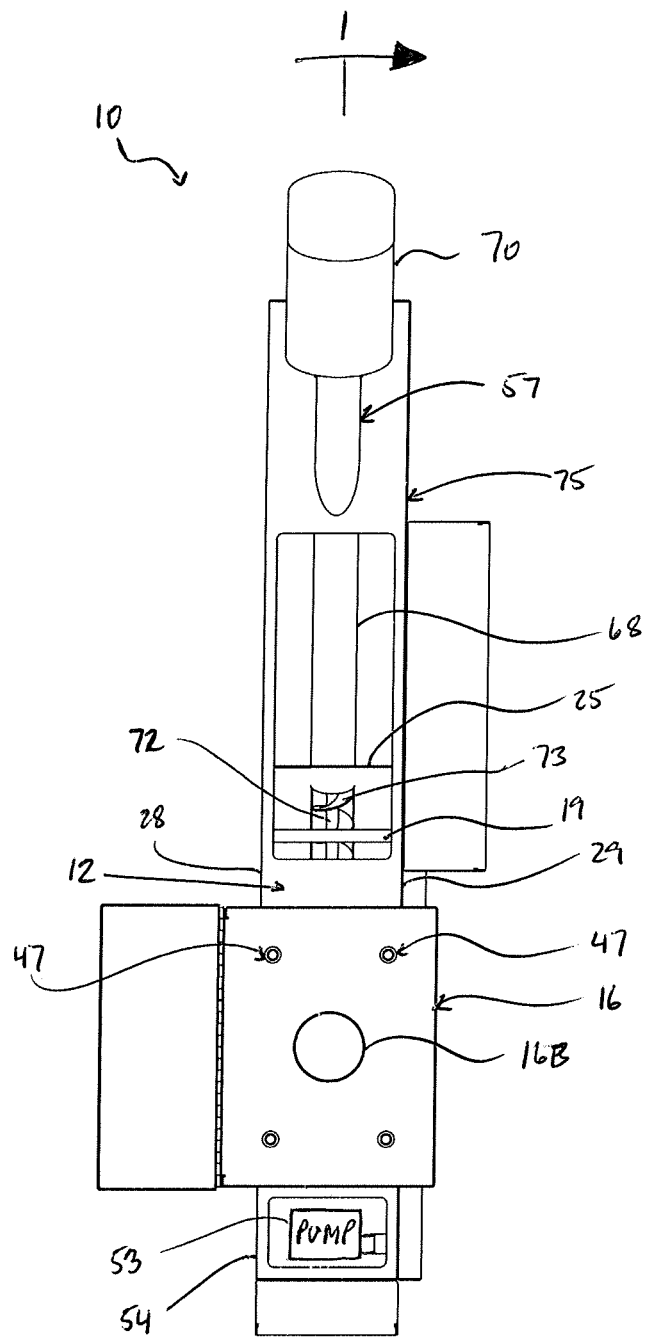

SCRUBBER FOR TREATING EXHAUST GAS FROM BIOMASS COMBUSTION

This application claims the benefit under 35 U.S.C. 119(e) of U.S. Provisional Application Ser. No. 62/976,620 filed Feb. 14, 2020.

FIELD OF THE INVENTION

The present invention relates to a scrubber for treating exhaust gas generated by combustion of biomass, which comprises a plurality of scrubbing stages and is configured to scrub or filter the exhaust gas with liquid and solid filter medium in order to remove particulate from the exhaust gas before discharging to the ambient environment.

BACKGROUND

Biomass can be combusted in a furnace to generate heat; however, combustion of this type of material generates harmful particulates such as potassium chloride. It is desirable to remove these particulates from exhaust gas generated by the combustion of biomass before discharging to atmosphere, or more generally to the ambient environment.

SUMMARY OF THE INVENTION

According to an aspect of the invention there is provided a scrubber for treating exhaust gas generated by combustion of biomass comprising:

a plurality of chambers each defining an inlet for receiving a flow of the exhaust gas and an outlet spaced from the inlet for releasing the flow of the exhaust gas, the inlet and the outlet of each chamber collectively defining a path of the flow of exhaust gas through the chamber;

at least one nozzle mounted in a first one of the chambers at an intermediate location between the inlet and the outlet of the first chamber and configured to dispense scrubbing liquid in a sheet oriented transversely to the path of the flow of the exhaust gas through the first chamber and spanning across the first chamber such that the flow of the exhaust gas passes through the sheet of the scrubbing liquid;

a second one of the chambers defining a reservoir for containing scrubbing liquid;

a baffle mounted in the second chamber at an intermediate location between the inlet and the outlet of the second chamber and configured to redirect the path of the flow of the exhaust gas within the second chamber into the reservoir; and a third one of the chambers being arranged to support a sheet of solid filter medium spanning across the third chamber at an intermediate location between the inlet and the outlet of the third chamber such that the flow of the exhaust gas through the third chamber passes through the solid filter medium.

This provides a simple multi-stage arrangement for removing solid particles in the exhaust gas before discharging to atmosphere.

Preferably, the third chamber is disposed downstream of both the first and second chambers relative to the flow of the exhaust gas through the scrubber.

Preferably, the first and second chambers are serially fluidically communicated.

In such an arrangement, preferably, the first chamber is disposed upstream of the second chamber relative to the flow of the exhaust gas through the scrubber.

Preferably, the at least one nozzle in the first chamber comprises a plurality of nozzles arranged at spaced locations relative to the path of the exhaust flow through the first chamber, each nozzle being configured to dispense a sheet of the scrubbing liquid spanning across the first chamber and oriented transversely to the path of the flow of the exhaust gas through the first chamber.

Preferably, each of the at least one nozzle in the first chamber is configured to dispense the sheet of scrubbing liquid at an oblique angle to the path of the flow of exhaust gas through the first chamber.

Preferably, each nozzle is configured to dispense the sheet of scrubbing liquid downwardly and in the direction of the flow of the exhaust gas through the first chamber such that the sheet is arranged at the oblique angle.

Preferably, the first and second chambers are defined by a common tank such that the at least one nozzle of the first chamber acts to refill the reservoir. This provides a relatively simple arrangement in which the first and second chambers are commonly housed.

In such an arrangement, the scrubber may further include a pump which is fluidically communicated with the reservoir and the at least one nozzle so as to circulate the scrubbing liquid from the reservoir to the at least one nozzle.

Preferably, the third chamber includes at least one nozzle for wetting the solid filter medium and the third chamber is disposed above the second chamber such that the liquid used to wet the solid filter medium is enabled to gravitationally flow from the third chamber to the reservoir in the second chamber.

In such an arrangement, preferably, the scrubber further includes a fill-level sensor in the second chamber configured to detect when the scrubbing liquid contained in the reservoir falls below a threshold level, the fill-level sensor being operatively communicated with the at least one medium-wetting nozzle in the third chamber such that the at least one medium-wetting nozzle is activated when the scrubbing liquid falls below the threshold level.

Preferably, the scrubber further includes a sediment collection reservoir which is fluidically communicated with the first and second chambers for collecting used scrubbing liquid and a sediment removal conveyor configured to extract sediment from the sediment collection reservoir and transfer the extracted sediment to waste. Thus the scrubber can run continuously as the sediment can be automatically extracted to clean the sediment collection reservoir.

Preferably, the sediment collection reservoir has an inclined bottom and the sediment removal conveyor comprises a conveying member operable to transfer the sediment which extends into the sediment collection reservoir and along the inclined bottom thereof.

Preferably, the conveying member is in the form of an auger operatively supported for rotation about an inclined axis.

In arrangements including the sediment removal conveyor, preferably, the plurality of chambers includes a preliminary drying chamber which is upstream of the first, second and third chambers, and the sediment removal conveyor extends through the preliminary drying chamber so that the exhaust gas passing through the preliminary drying chamber acts to dry the extracted sediment removed from the sediment collection reservoir.

According to another aspect of the invention there is provided a scrubber for treating exhaust gas generated by combustion of biomass comprising at least one chamber configured to apply a scrubbing medium to the exhaust gas for removing solid particles from the exhaust gas. The scrubber includes a sediment collection reservoir which is fluidically communicated with the at least one chamber for collecting used scrubbing medium in the form of a fluid, and particularly in the form of a liquid. The scrubber further includes a sediment removal conveyor configured to extract sediment from the sediment collection reservoir and transfer the extracted sediment to waste.

According to yet another aspect of the invention there is provided a scrubber for treating exhaust gas generated by combustion of biomass comprising at least one chamber configured to apply a scrubbing medium to the exhaust gas for removing solid particles from the exhaust gas. The at least one chamber includes a pair of chambers, one disposed above the other. A lower one of the pair of chambers defines a reservoir for containing scrubbing liquid, and an upper one of the pair of chambers is arranged to support a sheet of solid filter medium spanning across the third chamber such that the flow of the exhaust gas through this chamber passes through the solid filter medium. The upper chamber includes at least one nozzle for wetting the solid filter medium. As the upper chamber is located above the lower chamber, the liquid used to wet the solid filter medium is enabled to gravitationally flow from the third chamber to the reservoir in the second chamber.

According to a further aspect of the invention there is provided a scrubber for treating exhaust gas generated by combustion of biomass comprising at least one chamber configured to apply a scrubbing medium to the exhaust gas for removing solid particles from the exhaust gas. The at least one chamber includes a pair of chambers which are serially fluidically communicated. A first one of the pair of chambers comprises at least one nozzle mounted therein and configured to dispense scrubbing liquid in a sheet oriented transversely to the path of the flow of the exhaust gas through the first chamber and spanning across the first chamber such that the flow of the exhaust gas passes through the sheet of the scrubbing liquid. A second one of the chambers defines a reservoir for containing scrubbing liquid, and there is provided a baffle is mounted in the second chamber and configured to direct the exhaust gas into the reservoir. The first and second chambers are defined by a common tank such that the at least one nozzle acts to refill the reservoir. The scrubber further includes a pump which is fluidically communicated with the reservoir and the at least one nozzle so as to circulate the scrubbing liquid from the reservoir to the at least one nozzle.

BRIEF DESCRIPTION OF THE DRAWINGS

The invention will now be described in conjunction with the accompanying drawings in which:

FIG. 2 is a top plan view of the scrubber of FIG. 1, in which some components are omitted for convenience of illustration and access panels are shown in an open position to show an interior of the scrubber;

In the drawings like characters of reference indicate corresponding parts in the different figures.

DETAILED DESCRIPTION

Figure 1:
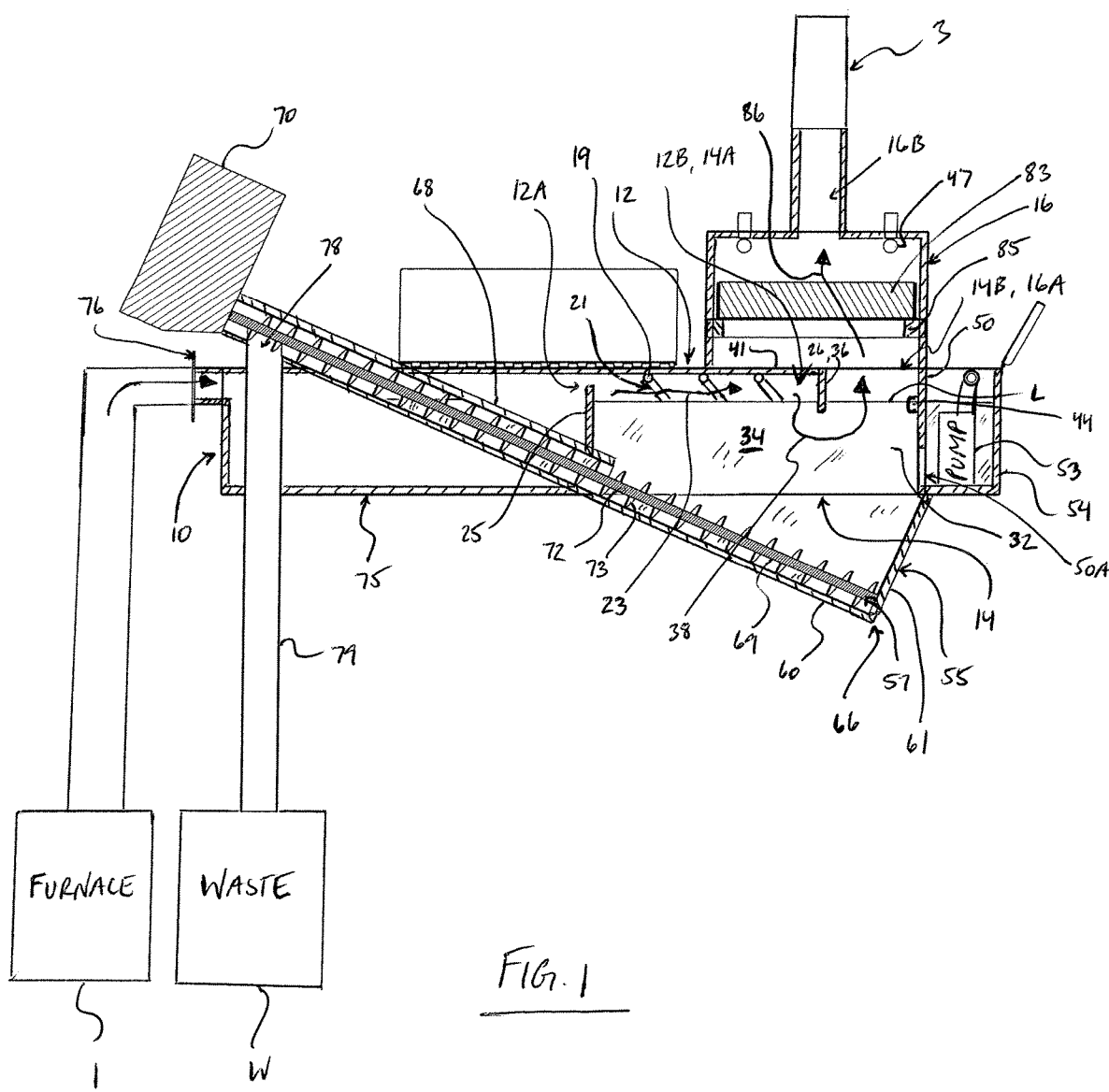
FIG. 1 is a cross-sectional view taken along line 1-1 in FIG. 2 showing a scrubber according to an arrangement of the present invention.
Figure 3:
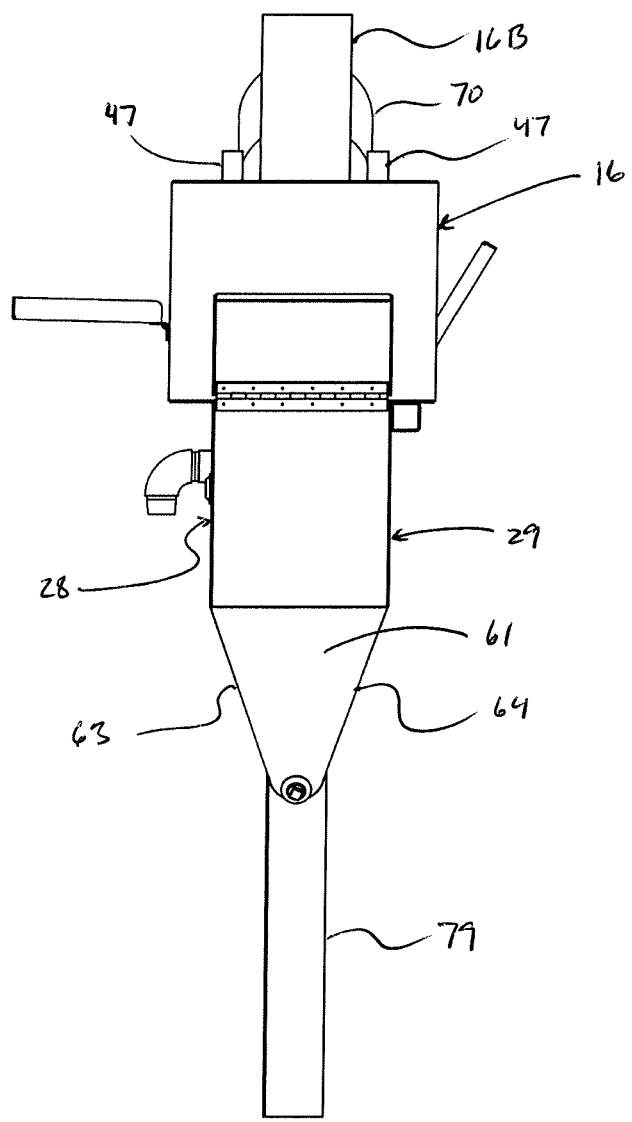
FIG. 3 is an end view of the scrubber of FIG. 1, in which some components are omitted for convenience of illustration and access panels are shown in an open position to show an interior of the scrubber.
Figure 4:
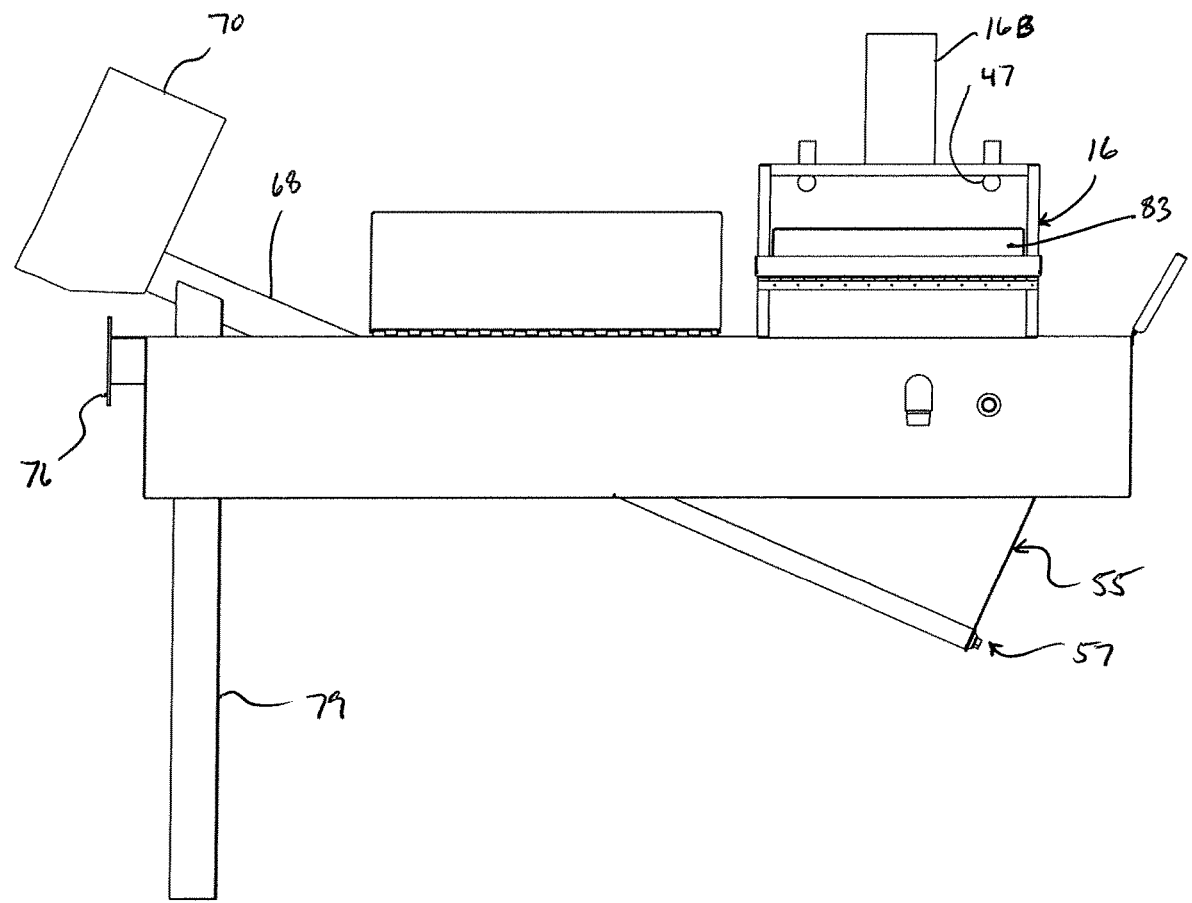
FIG. 4 is a side view of the scrubber of FIG. 1, in which some components are omitted for convenience of illustration and access panels are shown in an open position to show an interior of the scrubber.
Figure 5:
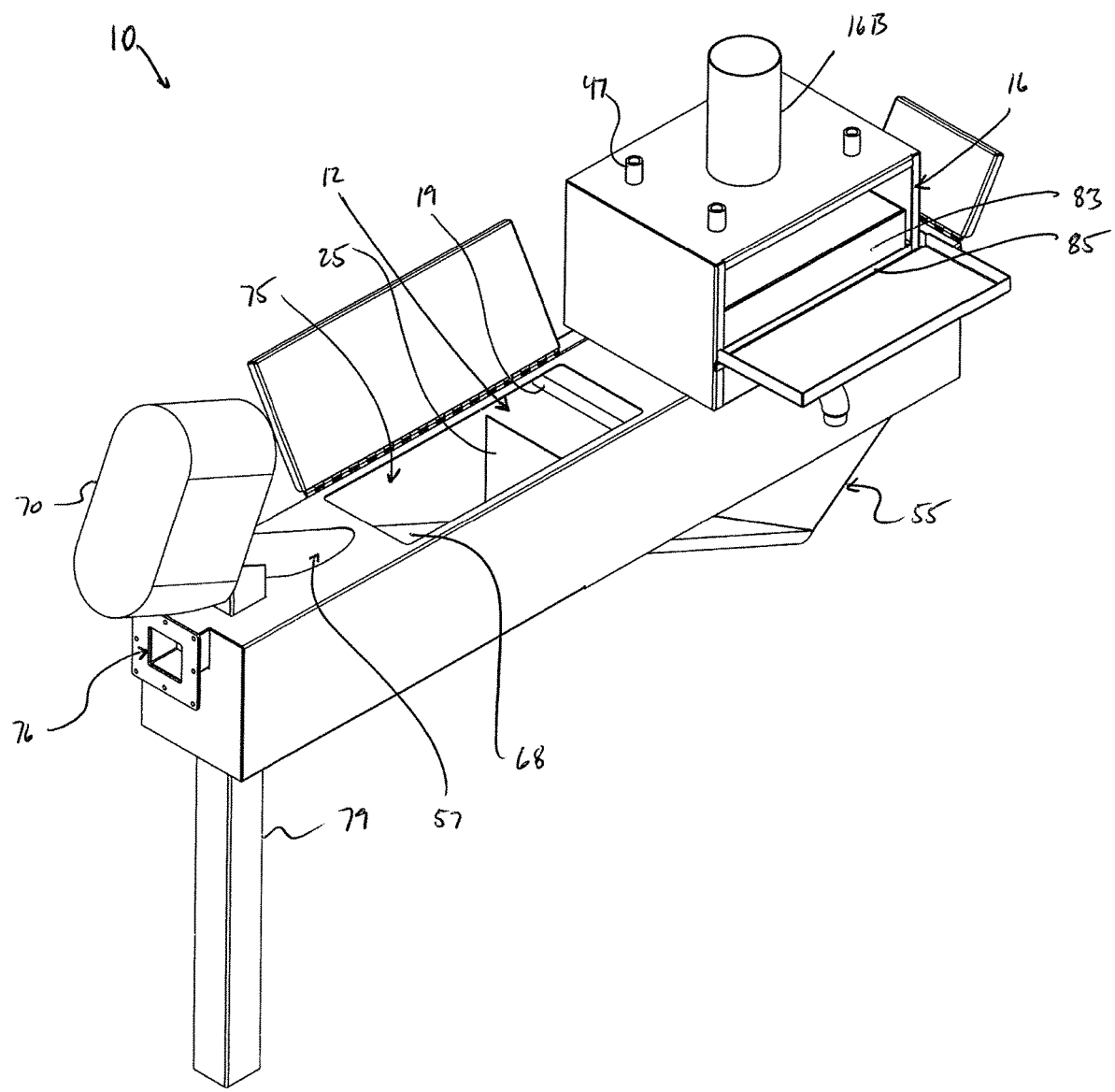
FIG. 5 is a perspective view of the scrubber of FIG. 1, in which some components are omitted for convenience of illustration and access panels are shown in an open position to show an interior of the scrubber.
Figure 6:
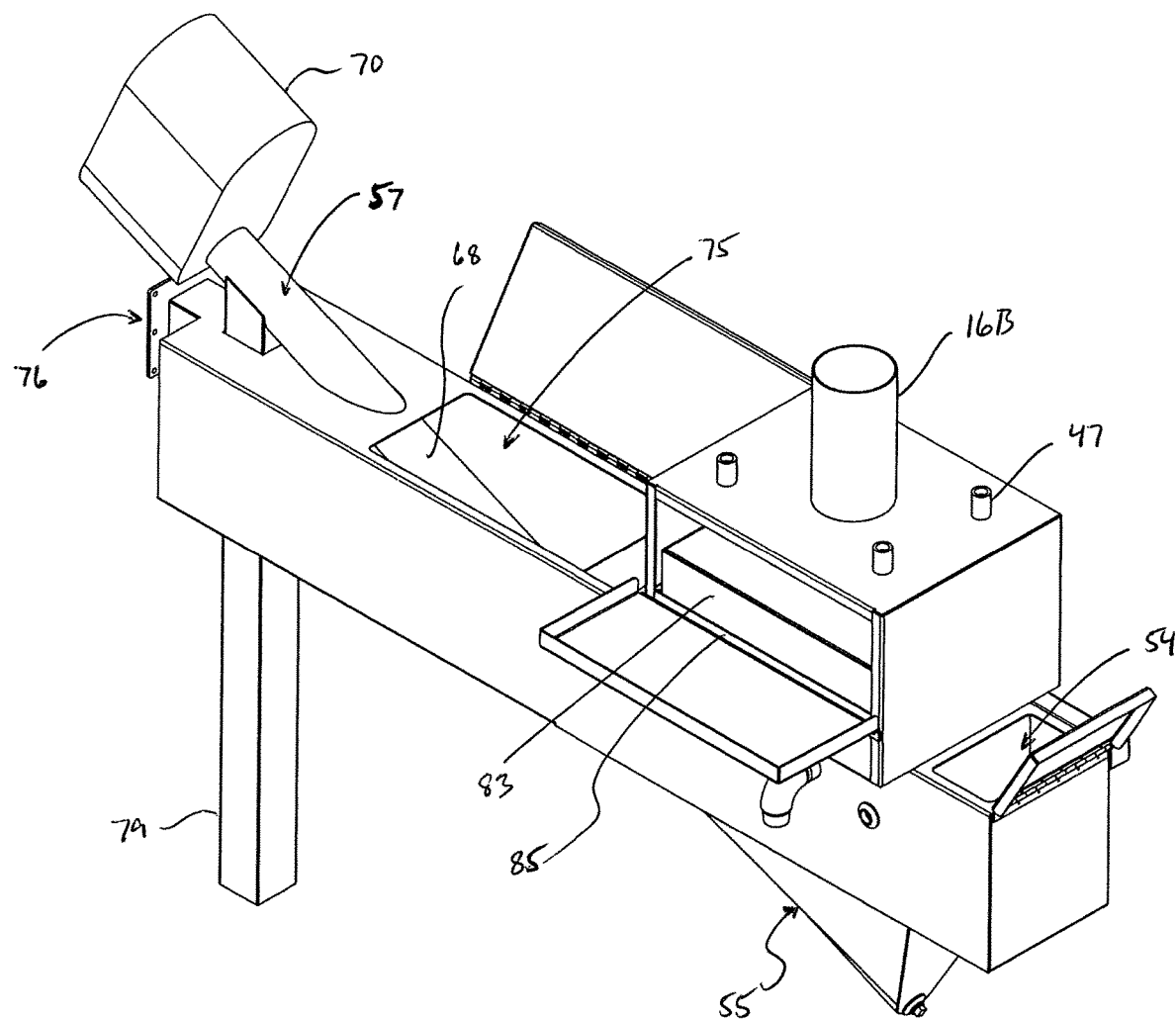
FIG. 6 is another perspective view like that shown in FIG. 5.

The accompanying figures show a scrubber generally indicated at reference numeral 10 for treating exhaust gas generated by combustion of biomass.

With reference to FIG. 1, the scrubber 10 is arranged to be disposed in series fluidic communication with a furnace 1, in which the biomass is combusted, and a chimney 3 arranged for discharging or expelling the exhaust gas to atmosphere, or more generally the ambient environment. More specifically, the scrubber 10 is located intermediate the furnace 1 and the chimney 3 so that untreated exhaust gas released from the furnace 1 after being passed through a heat exchanger of the furnace can be treated or filtered to remove harmful particulates in the form of solid particles, such as potassium chloride, carried by the exhaust gas before the same is discharged to the surrounding environment.

The scrubber 10 comprises at least one chamber, such as that indicated at 12, configured to apply a scrubbing medium to the exhaust gas for removing solid particles from the exhaust gas. In the illustrated arrangement, there are a plurality of scrubbing chambers as indicated at 12, 14 and 16. Each scrubbing chamber defines an inlet, such as 12A or 14A or 16A, for receiving a flow of the exhaust gas into the chamber, and an outlet, such as 12B or 14B or 16B, which is spaced from the inlet so as to be distinct and at a spaced location therefrom for releasing the flow of the exhaust gas from the chamber. The inlet and the outlet of each scrubbing chamber collectively define a general path of flow of exhaust gas through the chamber.

One of the scrubbing chambers 12 includes at least one nozzle 19 mounted at an intermediate location between the inlet 12A and the outlet 12B and configured to dispense scrubbing medium in the form of a liquid in a sheet 21 oriented transversely to the path of the flow of the exhaust gas through the first chamber 12, schematically represented by arrow 23. The sheet 21 of scrubbing liquid is arranged to span across the first chamber 12 such that the flow of the exhaust gas passes through the sheet 21 of the scrubbing liquid on its path to the outlet 12B. Thus each nozzle 19 forms a permeable barrier in the form of a thin curtain of liquid spanning a cross-section of the chamber, which the exhaust gas is effectively forced to cross on its path through the first chamber 12. This permeable barrier acts to at least partially remove solid particles carried by the exhaust gas while permitting a gaseous portion of the exhaust gas to pass through to a subsequent stage of the scrubber.

In the illustrated arrangement, the first chamber 12 comprises a pair of longitudinally spaced apart walls 25 and 26, one of which defines the inlet 12A and the other defining the outlet 12B, so that the exhaust gas flow is generally longitudinally directed through the first chamber. The first chamber 12 includes a pair of transversely spaced apart walls 28 and 29 defining a width of the chamber, and each nozzle 19 is arranged to span substantially the full width of the chamber 12, as more clearly shown in FIG. 2, so that the sheet 21 of scrubbing liquid dispensed thereby spans substantially the full width of the chamber 12. Furthermore, the scrubbing liquid is dispensed by the nozzle 19 at a suitable pressure so that the curtain-like barrier is formed across substantially a full height of a pathway formed within the first chamber for the exhaust gas to flow through.

Furthermore, the illustrated arrangement of scrubber 10 comprises a plurality of the curtain nozzles 19 arranged at spaced locations relative to the path of the exhaust flow through the first chamber represented by arrow 23. Thus, the nozzles 19 are generally uniformly longitudinally spaced each from the next in the first chamber 12.

As more clearly shown in FIG. 1, each curtain nozzle 19 is configured to dispense the sheet 21 of scrubbing liquid at an oblique angle to the path of the flow of exhaust gas 23 through the first chamber. More specifically, each nozzle 19 is configured to dispense the sheet of scrubbing liquid downwardly and in the direction 23 of the flow of the exhaust gas through the first chamber such that the sheet 21 is arranged at the oblique angle. Thus, gravity cooperates with the mechanical barrier provided by the liquid curtain to carry the solid particles away from the exhaust gas.

Another one of the chambers 14 of the scrubber defines a reservoir 32 for containing scrubbing liquid 34, and there is provided in this second chamber 14 a baffle 36 configured to direct the exhaust gas into the scrubbing liquid. More specifically, the baffle 36 is mounted at an intermediate location between the inlet 14A and the outlet 14B of the second chamber, and it is configured to redirect the path of the flow of the exhaust gas within the second chamber, as schematically represented by arrow 38, into the reservoir 32 containing the liquid 34.

In the illustrated arrangement, the baffle 36 is defined by the wall 26 which is imperforate and depends downwardly from a carrier upper wall 41. Thus the exhaust gas flow is redirected under the baffle 36, where there is located a threshold level L of scrubbing liquid so that as the exhaust gas flow passes under the baffle it is forced to pass through the scrubbing liquid. This scrubbing stage provided by the chamber 16 may be referred to as a bubbler as the deflection of the gas flow into a bath of scrubbing liquid generates bubbles.

An inner most end of the baffle 36, or the bottom of the wall 26, defines the threshold level L of scrubbing liquid to be contained in the reservoir 32. Beneath this level the exhaust gas flow can escape between the baffle and the scrubbing liquid so as not to be substantially treated by the scrubbing liquid. In FIG. 1, the illustrated level of scrubbing liquid 34 is above the bottom of the wall 26 for clarity of illustration.

As the exhaust gas which is hot flows through the second chamber 14, the scrubbing liquid will vaporize and thus the amount of scrubbing liquid in the reservoir 32 will gradually decrease unless replenished. Thus, a fill-sensor schematically indicated at 44 is located in the second chamber 14 and configured to detect when the scrubbing liquid contained in the reservoir falls below the threshold level L, for example by being arranged at a height in the reservoir 32 corresponding to the threshold level. The fill-level sensor 44 is operatively communicated with an injector nozzle 47 which is activated when the scrubbing liquid falls below the threshold level L so as to replenish the scrubbing liquid to the amount required for scrubbing bubbling action.

In the illustrated arrangement, the first and second scrubbing chambers 12, 14 are serially fluidically communicated with the first chamber 12 being disposed upstream of the second chamber relative to the flow of the exhaust gas through the scrubber. Thus, the first and second chambers are defined by a common tank collectively defined at least by walls 25, 26, 28, 29, 41 and 50 such that the curtain nozzles 19 act to refill the reservoir 32. This provides a relatively simple arrangement in which the first and second chambers are commonly housed. In the illustrated arrangement, the reservoir 32 spans the full bottom of the tank such that the scrubbing liquid acts to define a bottom boundary of the first chamber 12. This may allow for regulation of a size of the first chamber in a height direction, provided that the scrubbing liquid is filled to a height at which it reaches and covers the bottom of the baffle 36.

Since the curtain nozzles 19 dispense scrubbing liquid into the reservoir 32, the scrubber includes a pump 53 (schematically shown) which is fluidically communicated with the reservoir 32 and the curtain nozzles 19, and which is configured to circulate the scrubbing liquid from the reservoir 32 to the nozzles 19. An inlet of the pump 53 for receiving fluid is in fluidic communication with the reservoir 32 and an outlet of the pump for discharging fluid is in fluidic communication with the curtain nozzles 19. In the illustrated arrangement, the pump 53 is housed in a separate chamber 54 to the side of the second chamber 14 so as to be communicated with the second chamber via an opening 50A defined by the wall 50. Piping (not clearly shown) is provided along the wall 29 of the tank to fluidically couple the pump 53 with each of the curtain nozzles 19 to supply the same with the circulated liquid drawn from the reservoir 32.

Furthermore, as a consequence of the common tank arrangement there is no distinctly defined outlet 12B of the first chamber 12 nor inlet 14A of the second chamber 14 but rather a transition space intermediate the downstream-most curtain nozzle 19 and the baffle 36. The outlet 14B of the second chamber is defined by an opening in the top of the tank, on a downstream side of the baffle 36 that is opposite to the last nozzle 19 in the first chamber.

The solid particles in the used scrubbing liquid gravitationally collect at the bottom of the reservoir 32 as sediment. Thus there is provided a sediment collection reservoir 55 which is fluidically communicated with the first and second chambers 12, 14 for collecting used scrubbing liquid, as well as a sediment removal conveyor 57 configured to extract sediment from the sediment collection reservoir 55 and transfer the extracted sediment to waste W (schematically shown). Thus the scrubber can run continuously as the sediment can be automatically extracted to clean the sediment collection reservoir 55 and prevent build-up of the sediment exceeding the volume of the collection reservoir 55.

In the illustrated arrangement, the sediment collection reservoir 55 effectively forms an extension of the scrubbing liquid-containing reservoir 32. The sediment collection reservoir 55 comprises an inclined bottom 60 which is opposite the upper wall 14 of the tank defining the first and second chambers 12, 14; an inclined end wall 61 which extends downwardly and inwardly from the tank end wall 50; and a pair of opposite sidewalls 63, 64 which are oriented in downwardly converging orientation such that the sediment collection reservoir 55 is generally funnel-shaped to define a single lowest point 66 towards which the sediment can gravitationally settle.

The sediment removal conveyor 57 comprises a tubular conveyor housing 68 which is in fluidic communication with the sediment collection reservoir 55. In the conveyor housing 68 there is supported a conveying member 69, which is operable to transfer the sediment in a conveying direction along the housing 68, and which extends from the housing 68 into the sediment collection reservoir 55 and along the inclined bottom 60 thereof. The removal conveyor 57 includes a drive motor 70 operatively connected to the conveying member 69 to drive movement thereof to effect the transfer of the sediment out of the collection reservoir 55.

The conveying member 69 in the form of an auger having a shaft 72 and a helical flight 73 is operatively supported in the housing 68 for rotation about an axis defined by the shaft 72 which is inclined so as to lie along the bottom 60 of the sediment collection reservoir 55.

As the removed sediment is wet, the scrubber 10 includes an additional chamber through which exhaust gas flows, which is a preliminary drying chamber 75 located upstream of the first and second chambers 12, 14 relative to the flow of exhaust gas through the scrubber, simply for the purpose of drying the removed sediment. The preliminary drying chamber 75 is serially fluidically connected to the first scrubbing chamber 12 and defines an inlet 76 to the scrubber 10 as a whole, such that the exhaust gas entering the preliminary drying chamber 75 is still relatively hot as it has not yet been treated by any scrubbing liquid which typically will act to reduce a temperature of the exhaust gas. The conveyor housing 68 extends through the drying chamber 75, such that an upper portion of the sediment removal conveyor 57 is disposed in the drying chamber, so that the housing 68 acts as a heat exchange tube to transfer heat from the surrounding exhaust gas flowing past the same to an interior of the housing 68 where the sediment is contained, thereby drying the extracted sediment which has been removed from the sediment collection reservoir 55.

The conveyor housing 68 defines a discharge opening 78 with a waste chute 79 extending generally downwardly therefrom to guide the dried sediment by gravity away from the scrubber. The chute 79 can be in communication with a waste collection container W.

Returning to the treatment of the exhaust gas, the scrubber 10 includes yet another scrubbing chamber 16 downstream of both the first and second chambers 12, 14, which is arranged to support a sheet of solid filter medium 83 spanning across the third chamber at an intermediate location between the inlet 16A and the outlet 16B of the third chamber such that the flow of the exhaust gas through the third chamber passes through the solid filter medium 83. In the illustrated arrangement, the solid filter medium 83 is supported by a horizontally oriented perforated tray 85 and comprises a fluidically permeable solid material such as a layer of wood chips or fibreglass. Also, a path of flow of the exhaust gas through the third chamber 16, as represented by arrow 86, is generally upward from the inlet 16A to the outlet 16B.

Periodically the solid filter medium 83 is wetted to be cleaned by rinsing and/or to provide further scrubbing action by combining the solid filter medium with a scrubbing liquid such as water. Thus, the third scrubbing chamber 16 is disposed above the second scrubbing chamber 14, and wetting nozzles mounted in the third scrubbing chamber 16 which are indicated at 47 are the same nozzles which are in operative communication with the fill-level sensor 44, so that the liquid used to wet the solid filter medium 83 can also act to replenish the scrubbing liquid containment reservoir 32 by gravitationally flowing from the third chamber 16 to the second chamber 14 after migrating through the permeable solid filter medium 83. Thus the wetting nozzles 47 serve a dual purpose. In other arrangements, a single nozzle 47 may be provided so long as it suitably rinses the solid filter medium 83.

Furthermore, it will be appreciated that in the illustrated arrangement the third scrubbing chamber 16 is disposed vertically above the second scrubbing chamber 14 and is serially fluidically communicated with same. The inlet 16A and outlet 16B of the third scrubbing chamber are vertically spaced apart such that the filter medium 83 is disposed at a vertically intermediate location therebetween. The wetting nozzles 47 are disposed above the solid filter medium 83 and are configured to dispense scrubbing liquid to cover an entire surface area of the solid filter medium. The vertical arrangement within the third scrubbing chamber 16 enables the dispensed scrubbing liquid to gravitationally migrate through the solid filter medium and subsequently towards the reservoir 32 in the second chamber 14. The inlet 16A of the third chamber, through which the scrubbing liquid passes from the third scrubbing chamber 16 to the second scrubbing chamber 14, is arranged vertically in line with the lowest point 66 of the sediment collection reservoir 55 so that any solid particles removed from the filter medium 83 by rinsing action can subsequently be extracted from the scrubber.

The arrangement described hereinbefore provides a simple multi-stage system for removing solid particles in the exhaust gas before discharging to atmosphere, which can be operated with minimal interruption for cleaning purposes.

In use, once the exhaust gas is generated by the combustion of biomass in the furnace 1, the untreated exhaust gas is guided into the scrubber through the inlet 76. Upon entering the scrubber, the exhaust gas is passed through the preliminary drying chamber 75 where it heats the exposed housing 68 of the sediment removal conveyor 57.

The still untreated exhaust gas is subsequently guided into the first scrubbing chamber 12, which is disposed horizontally adjacent the preliminary chamber 75. In the first scrubbing chamber 12 the exhaust gas is confined in space between the upper wall 41 at the top, side walls 28 and 29, and the bath of scrubbing liquid 34 at the bottom. The exhaust gas is consequently guided along path 23 along which there is located a plurality of liquid curtains 21 spanning the effective transverse cross-section of the first chamber 12. Particulate is removed from the exhaust gas at each curtain 21 of liquid, and this particulate is eventually carried into the bath of liquid 34.

After the final curtain 21, the exhaust gas is deflected by the wall 26, which acts as a baffle, into the bath of scrubbing liquid 34. As the direction of flow of the exhaust gas immediately upstream of the baffle 36 is substantially horizontal, and the baffle 36 presents a surface substantially normal to this direction of flow, the exhaust gas is redirected downwardly but it is forced by the baffle only a short depth into the bath. The exhaust gas exits the bath on the opposite side of the baffle where it is guided upwardly to the third scrubbing chamber 16.

The exhaust gas is guided upwardly through the third chamber 16 through the solid filter medium 83. Subsequently the gas is discharged to the ambient environment through the outlet 16B which defines an outlet of the scrubber as a whole.

Particulate removed at the first and second stages of treatment corresponding to the first and second scrubbing chambers 12, 14 is collected by gravity in the sediment collection reservoir 55. The sediment removal conveyor 57 is thus operated to transfer the sediment at the bottom 60 of the reservoir 55 therefrom and to another location, such as waste W. The conveying member 69 can be actuated to operate intermittently or continuously so that the sediment is automatically removed without human intervention to clean the reservoir 55.

The scrubbing liquid 34 contained in the reservoir 32 and dispensed into same by the curtain nozzles 19 is circulated by the pump 53 back to the nozzles 19. This circulation loop occurs continuously without interruption as the curtain nozzles 19 apply the scrubbing medium to the exhaust gas to treat same in the first chamber 12.

As the exhaust gas passes through the second scrubbing chamber 14, as well as the first chamber 12 where the bath of scrubbing liquid 34 is exposed to same, scrubbing liquid is vaporized. The fill-level sensor 44 detects when the actual level of scrubbing liquid in the reservoir 32 falls below the threshold level so as to activate at least one injector nozzle 47 to replenish the bath, so that the second scrubbing chamber 14 can continue to apply its scrubbing medium to the exhaust gas.

The injector nozzles 47 also act as wetting nozzles to wet the solid filter medium 83. Thus the solid filter medium is rinsed with scrubbing liquid, such as water, when the fill-level sensor indicates that the actual level of liquid in the bath has fallen below the threshold amount. Thus the injector nozzles inject new scrubbing liquid to the scrubber and are not supplied by the circulation pump 53.

The scope of the claims should not be limited by the preferred embodiments set forth in the examples but should be given the broadest interpretation consistent with the specification as a whole.

The invention claimed is:

1. A scrubber for treating exhaust gas generated by combustion of biomass comprising:
a plurality of chambers each defining an inlet for receiving a flow of the exhaust gas and an outlet spaced from the inlet for releasing the flow of the exhaust gas, the inlet and the outlet of each chamber collectively defining a path of flow of exhaust gas through the chamber;
at least one nozzle mounted in a first one of the chambers at an intermediate location between the inlet and the outlet of the first chamber and configured to dispense scrubbing liquid in a sheet oriented transversely to the path of the flow of the exhaust gas through the first chamber and spanning across the first chamber such that the flow of the exhaust gas passes through the sheet of the scrubbing liquid;
a second one of the chambers defining a reservoir for containing scrubbing liquid;
a baffle mounted in the second chamber at an intermediate location between the inlet and the outlet of the second chamber and configured to redirect the path of the flow of the exhaust gas within the second chamber into the reservoir; and
a third one of the chambers being arranged to support a sheet of solid filter medium spanning across the third chamber at an intermediate location between the inlet and the outlet of the third chamber such that the flow of the exhaust gas through the third chamber passes through the solid filter medium.

2. The scrubber of claim 1 wherein the third chamber is disposed downstream of both the first and second chambers relative to the flow of the exhaust gas through the scrubber.

3. The scrubber of claim 1 wherein the first and second chambers are serially fluidically communicated.

4. The scrubber of claim 3 wherein the first chamber is disposed upstream of the second chamber relative to the flow of the exhaust gas through the scrubber.

5. The scrubber of claim 1 wherein the at least one nozzle in the first chamber comprises a plurality of nozzles arranged at spaced locations relative to the path of the exhaust flow through the first chamber, each nozzle being configured to dispense a sheet of the scrubbing liquid spanning across the first chamber and oriented transversely to the path of the flow of the exhaust gas through the first chamber.

6. The scrubber of claim 1 wherein each of the at least one nozzle in the first chamber is configured to dispense the sheet of scrubbing liquid at an oblique angle to the path of the flow of exhaust gas through the first chamber.

7. The scrubber of claim 6 wherein each nozzle is configured to dispense the sheet of scrubbing liquid downwardly and in the direction of the flow of the exhaust gas through the first chamber such that the sheet is arranged at the oblique angle.

8. The scrubber of claim 1 wherein the first and second chambers are defined by a common tank such that the at least one nozzle acts to refill the reservoir.

9. The scrubber of claim 8 further including a pump which is fluidically communicated with the reservoir and the at least one nozzle so as to circulate the scrubbing liquid from the reservoir to the at least one nozzle.

10. The scrubber of claim 1 wherein the third chamber includes at least one nozzle for wetting the solid filter medium and the third chamber is disposed above the second chamber such that the liquid used to wet the solid filter medium is enabled to gravitationally flow from the third chamber to the reservoir in the second chamber.

11. The scrubber of claim 10 further including a fill-level sensor in the second chamber configured to detect when the scrubbing liquid contained in the reservoir falls below a threshold level, the fill-level sensor being operatively communicated with the at least one medium-wetting nozzle in the third chamber such that the at least one medium-wetting nozzle is activated when the scrubbing liquid falls below the threshold level.

12. The scrubber of claim 1 further including a sediment collection reservoir which is fluidically communicated with the first and second chambers for collecting used scrubbing liquid and a sediment removal conveyor configured to extract sediment from the sediment collection reservoir and transfer the extracted sediment to waste.

13. The scrubber of claim 12 wherein the sediment collection reservoir has an inclined bottom and the sediment removal conveyor comprises a conveying member operable to transfer the sediment which extends into the sediment collection reservoir and along the inclined bottom thereof.

14. The scrubber of claim 13 wherein the conveying member is in the form of an auger operatively supported for rotation about an inclined axis.

15. The scrubber of claim 12 wherein the plurality of chambers includes a preliminary drying chamber which is upstream of the first, second and third chambers, and the sediment removal conveyor extends through the preliminary drying chamber so that the exhaust gas passing through the preliminary drying chamber acts to dry the extracted sediment removed from the sediment collection reservoir.

* * * * *